US010799975B2

(12) United States Patent
Ribic et al.

(10) Patent No.: US 10,799,975 B2
(45) Date of Patent: Oct. 13, 2020

(54) DIRECTED ENERGY DEPOSITION FOR PROCESSING GAS TURBINE ENGINE COMPONENTS

(71) Applicant: Rolls-Royce Corporation, Indianapolis, IN (US)

(72) Inventors: Brandon David Ribic, Carmel, IN (US); Quinlan Yee Shuck, Indianapolis, IN (US); Pavlo Earle, Indianapolis, IN (US); Jacque Sue Bader, Martinsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 497 days.

(21) Appl. No.: 15/423,181

(22) Filed: Feb. 2, 2017

(65) Prior Publication Data

US 2017/0246705 A1    Aug. 31, 2017

Related U.S. Application Data

(60) Provisional application No. 62/300,996, filed on Feb. 29, 2016.

(51) Int. Cl.
*B23K 15/02* (2006.01)
*B23K 26/34* (2014.01)
(Continued)

(52) U.S. Cl.
CPC .......... *B23K 15/02* (2013.01); *B23K 15/0006* (2013.01); *B23K 15/0026* (2013.01);
(Continued)

(58) Field of Classification Search
CPC .............. B23K 26/703; B23K 15/0006; B23K 15/0026; B23K 15/0086; B23K 26/34;
(Continued)

(56) References Cited

U.S. PATENT DOCUMENTS 3,854,842 A    12/1974 Caudill
4,073,599 A    2/1978 Allen et al.
(Continued)

FOREIGN PATENT DOCUMENTS

EP    1466718 A2    10/2004
EP    1674658 A1    6/2006
(Continued)

OTHER PUBLICATIONS

Wade Ceramic, "Advantages of Ceramic", (Year: 2014).*
(Continued)

*Primary Examiner* — Michael G Hoang
*Assistant Examiner* — Bonita Khlok
(74) *Attorney, Agent, or Firm* — Shumaker & Sieffert, P.A.

(57) ABSTRACT

Example systems may include an energy source, a material delivery device, and a computing device. The computing device, based on a target height of a layer deposited on a component by directed energy deposition, may control an energy source directed at a component and may control a material delivery device. Controlling the energy source may include advancing an energy beam along a first path to form an advancing molten pool on the component. Controlling the material delivery device may include delivering a material to the advancing molten pool. The material may combine with the advancing molten pool to form a first raised track having an actual height. The layer may include the first raised track. A deposited region of the component may include the layer. The actual height may affect a resultant microstructure within the deposited region.

17 Claims, 6 Drawing Sheets

(51) Int. Cl.
  *B23K 15/00* (2006.01)
  *B23K 26/342* (2014.01)
  *B23K 26/70* (2014.01)
  *B23P 6/00* (2006.01)
  *B23P 6/04* (2006.01)
  *B23K 101/00* (2006.01)
  *B23K 103/18* (2006.01)

(52) U.S. Cl.
  CPC .......... *B23K 15/0086* (2013.01); *B23K 26/34* (2013.01); *B23K 26/342* (2015.10); *B23K 26/702* (2015.10); *B23K 26/703* (2015.10); *B23P 6/002* (2013.01); *B23P 6/045* (2013.01); *B23K 2101/001* (2018.08); *B23K 2103/26* (2018.08)

(58) Field of Classification Search
  CPC .......... B23K 2103/26; B23K 2101/001; B23K 26/24; B23K 15/02; B23K 26/342; B23P 6/002; B23P 6/045; B33Y 10/00; B33Y 50/00; B33Y 50/02; G05B 2219/49016; G05B 2219/49017; G05B 2219/49018; G05B 2219/49023; B22F 2003/1057
  USPC .............. 219/121.6, 121.62, 121.63, 121.64, 219/121.65, 121.84, 121.85
  See application file for complete search history.

(56) References Cited

U.S. PATENT DOCUMENTS

| | | | |
|---|---|---|---|
| 4,214,355 | A | 7/1980 | Zelahy |
| 4,232,995 | A | 11/1980 | Stalker et al. |
| 4,247,254 | A | 1/1981 | Zelahy |
| 4,390,320 | A | 6/1983 | Eiswerth et al. |
| 4,411,597 | A | 10/1983 | Koffel et al. |
| 5,038,014 | A | 8/1991 | Pratt et al. |
| 5,183,385 | A | 2/1993 | Lee et al. |
| 5,479,704 | A | 1/1996 | Richter et al. |
| 5,554,837 | A | 9/1996 | Goodwater et al. |
| 6,122,564 | A | 9/2000 | Koch et al. |
| 6,146,476 | A * | 11/2000 | Boyer ............... B23B 51/00 148/525 |
| 6,172,327 | B1 | 1/2001 | Aleshin et al. |
| 6,269,540 | B1 | 8/2001 | Islam et al. |
| 6,326,585 | B1 | 12/2001 | Aleshin et al. |
| 6,459,951 | B1 | 10/2002 | Griffith et al. |
| 6,478,537 | B2 | 11/2002 | Junkin |
| 6,502,303 | B2 | 1/2003 | Updegrove et al. |
| 6,553,275 | B1 | 4/2003 | Mazumder et al. |
| 6,588,103 | B2 | 7/2003 | Fernihough et al. |
| 6,811,379 | B2 | 11/2004 | Fernihough et al. |
| 7,001,151 | B2 | 2/2006 | Wang et al. |
| 7,278,829 | B2 | 10/2007 | Roedl et al. |
| 7,472,478 | B2 | 1/2009 | Graham et al. |
| 7,587,818 | B2 | 9/2009 | Gorman et al. |
| 7,600,977 | B2 | 10/2009 | Shadbolt et al. |
| 7,765,022 | B2 | 7/2010 | Mazumder et al. |
| 7,784,668 | B2 | 8/2010 | Shubert |
| 7,984,547 | B2 | 7/2011 | Steinhardt |
| 8,049,132 | B2 | 11/2011 | Bouet et al. |
| 8,091,228 | B2 | 1/2012 | Hiskes |
| 8,096,030 | B2 | 1/2012 | Graichen |
| 8,376,211 | B2 | 2/2013 | Rose |
| 8,726,501 | B2 | 5/2014 | Schoonover et al. |
| 8,875,392 | B2 | 11/2014 | Richter |
| 8,996,156 | B2 | 3/2015 | Melzer-Jokisch et al. |
| 9,085,053 | B2 | 7/2015 | Tholen et al. |
| 9,085,980 | B2 | 7/2015 | Mittendorf et al. |
| 9,126,287 | B2 | 9/2015 | Bruck et al. |
| 2001/0002287 | A1 | 5/2001 | Kar et al. |
| 2003/0075836 | A1 | 4/2003 | Fong |
| 2004/0166187 | A1 | 8/2004 | Fong |
| 2004/0200816 | A1 | 10/2004 | Chung et al. |
| 2005/0023256 | A1 | 2/2005 | Sankaranarayanan et al. |
| 2005/0040147 | A1 | 5/2005 | Hoebel et al. |
| 2005/0109818 | A1 * | 5/2005 | Shimohata ............... C30B 29/52 228/119 |
| 2005/0133527 | A1 | 6/2005 | Dullea et al. |
| 2006/0032840 | A1 | 2/2006 | Bagavath-Singh |
| 2006/0054079 | A1 | 3/2006 | Withey et al. |
| 2006/0193612 | A1 | 8/2006 | Bouet et al. |
| 2007/0175875 | A1 | 8/2007 | Uckelmann et al. |
| 2008/0135530 | A1 | 6/2008 | Lee et al. |
| 2008/0173624 | A1 | 7/2008 | Drechsler et al. |
| 2008/0178994 | A1 | 7/2008 | Qi et al. |
| 2008/0201947 | A1 | 8/2008 | Richter et al. |
| 2008/0296270 | A1 | 12/2008 | Song et al. |
| 2009/0001059 | A1 | 1/2009 | Spallek et al. |
| 2010/0170878 | A1 | 7/2010 | Krause |
| 2010/0176097 | A1 | 7/2010 | Zhu |
| 2010/0257733 | A1 | 10/2010 | Guo et al. |
| 2011/0069301 | A1 | 3/2011 | Marzok et al. |
| 2011/0100964 | A1 | 5/2011 | Burbaum et al. |
| 2011/0103967 | A1 | 5/2011 | Hoebel et al. |
| 2011/0150636 | A1 | 6/2011 | Tholen et al. |
| 2013/0104397 | A1 | 5/2013 | Bunker |
| 2013/0298400 | A1 | 11/2013 | Munshi et al. |
| 2014/0259589 | A1 | 9/2014 | Xu et al. |
| 2014/0339206 | A1 | 11/2014 | Ott et al. |
| 2015/0040364 | A1 | 2/2015 | Ogasahara et al. |
| 2015/0041025 | A1 | 2/2015 | Wescott et al. |
| 2015/0048058 | A1 | 2/2015 | Bruck et al. |
| 2015/0079306 | A1 | 3/2015 | Schoeneborn et al. |
| 2015/0202717 | A1 | 7/2015 | Bruck et al. |

FOREIGN PATENT DOCUMENTS

| | | |
|---|---|---|
| EP | 1701004 A1 | 9/2006 |
| EP | 2014413 A1 | 1/2009 |
| EP | 2028342 A2 | 2/2009 |
| EP | 1880793 A2 | 1/2013 |
| EP | 2586562 A2 | 5/2013 |
| GB | 2453945 A | 4/2000 |
| WO | 92/08592 A1 | 5/1992 |
| WO | 00/00921 A1 | 1/2000 |

OTHER PUBLICATIONS

NPL search using Google (Year: 2014).*
Response to Communication filed Mar. 5, 2018, pursuant to Rule 69 EPC and Rule 70a(1) EPC dated Sep. 11, 2017, and Extended European Search Report dated Aug. 7, 2017, from counterpart European Application No. 17153748.3, 4 pp.
Communication pursuant to Rule 69 EPC and Rule 70a(1) EPC dated Sep. 11, 2017, from counterpart European Application No. 17153748.3, 2 pp.
Song et al., "Control of melt pool temperature and deposition height during direct metal deposition process", May 2011, International Journal of Advanced Manufacturing Technology, vol. 58, pp. 247-256.
Tang et al., "Melt Pool Temperature Control for Laser Metal Deposition Processes—Part 1: Online Temperature Control, Feb. 2010, Journal of Manufacturing Science and Engineering", vol. 132, pp. 011010-1 to 011010-9.
Tang et al. "Variable Powder Flow Rate Control in Laser Metal Deposition Processes", University of Missouri-Rolla, Aug. 2007, pp. 22-48.
Intent to Grant dated Aug. 22, 2018, from counterpart European Application No. 17153748.3, 7 pp.
Extended Search Report from counterpart European Application No. 17153748.3, dated Aug. 7, 2017, 7 pp.
Supplementary Examination Report with Notice of Eligibility for Grant, from counterpart Singaporean Application No. 10201700339Y, dated Aug. 28, 2019, 4 pp.

* cited by examiner

DIRECTED ENERGY DEPOSITION FOR PROCESSING GAS TURBINE ENGINE COMPONENTS

This application claims the benefit of U.S. Provisional Application No. 62/300,996 filed Feb. 29, 2016, which is incorporated herein by reference in its entirety.

TECHNICAL FIELD

The present disclosure generally relates to directed energy deposition.

BACKGROUND

High temperature components such as high temperature gas turbine engine components operate in extreme environments and may exhibit cracking or other forms of wear, for example, as a result of high temperature demands placed on such components or contact with other, adjacent components. Various techniques for modifying or repairing industrial components such as welding, brazing, cladding, and other techniques are known.

SUMMARY

In some examples, the disclosure describes an example technique that includes controlling, by a computing device, based on a target height of a layer to be deposited on a component by directed energy deposition, an energy source directed at the component to advance an energy beam along a first path to form an advancing molten pool on the component. The example technique may also include controlling, by the computing device, a material delivery device to deliver a material to the advancing molten pool. The material may combine with the advancing molten pool to form a first raised track having an actual height. The layer may include the first raised track. A deposited region of the component may include the layer. The actual height may affect a resultant microstructure within the deposited region.

In some examples, the disclosure describes an example system. The system may include an energy source directed at the component, a material delivery device, and a computing device. The computing device may be configured to, based on a target height of a layer to be deposited on the component by directed energy deposition, control the energy source to advance an energy beam along a first path to form an advancing molten pool on the component. The computing device may also be configured to, based on the target height of the layer, control the material delivery device to deliver a material to the advancing molten pool. The material may combine with the advancing molten pool to form a first raised track having an actual height. The layer may include the first raised track. A deposited region of the component may include the layer. The actual height may affect a resultant microstructure within the deposited region.

In some examples, the disclosure describes an example computer readable storage medium that may include instructions that, when executed, cause at least one processor to, based on a target height of a layer to be deposited on a component by directed energy deposition, control an energy source to advance an energy beam along a first path to form an advancing molten pool on the component. The example computer readable storage medium may also include instructions that, when executed, cause at least one processor to, based on a target height of a layer, control a material delivery device to deliver a material to the advancing molten pool. The material may combine with the advancing molten pool to form a first raised track having an actual height. The layer may include the first raised track. A deposited region of the component may include the layer. The actual height may affect a resultant microstructure within the deposited region.

The details of one or more examples are set forth in the accompanying drawings and the description below. Other features, objects, and advantages will be apparent from the description and drawings, and from the claims.

DETAILED DESCRIPTION

Figure 1A:
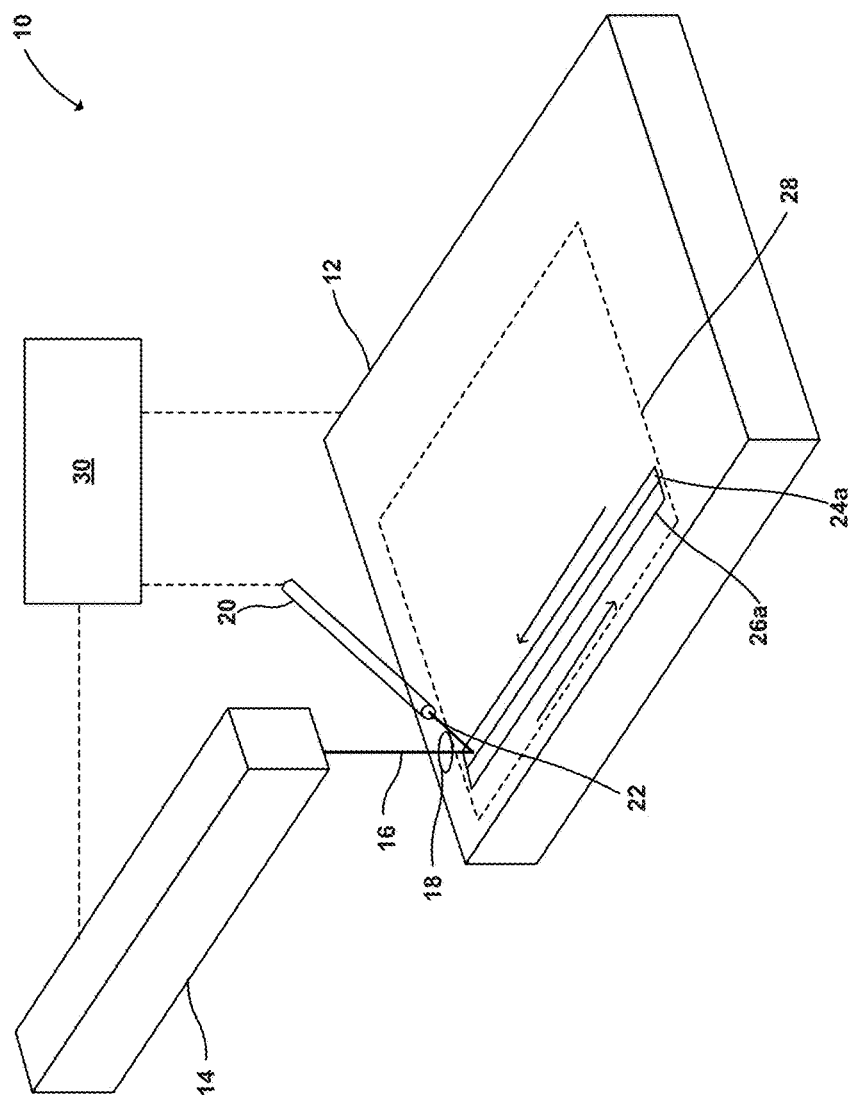
FIG. 1A is a conceptual and schematic block diagram illustrating an example system for directed energy deposition.

The disclosure describes example systems and techniques for directed energy deposition for modifying high temperature components. Example techniques for directed energy deposition may include directing an energy beam at a region of a component to form an advancing molten pool and delivering material to the advancing molten pool, resulting in combining of the material and a substrate of the component by sintering or melting, to form a deposited layer. Various parameters of directed energy deposition, discussed below, may affect a microstructure of the component on which material is deposited. For example, a process parameter may affect instantaneous volumetric heat content within a deposition region or volume, and the accumulation of heat within the deposition region may affect solidification and cooling rates. In turn, the solidification and cooling rates may affect grain morphology and solid state phase transformations that may evolve during the deposition process, which ultimately affects the microstructure in the region. For example, an increased cooling rate may result in finer microstructure, while reducing the cooling rate, for example, by pre-heating the substrate, may cause grain coarsening. Solidification structures introduced in the substrate as it cools may affect the propensity of the substrate for cracking. For example, a solidification structure that includes columnar grain boundaries may increase a propensity for cracking. Additionally, residual stresses that result from cooling may also result in cracking. Since the thickness or height of the deposited layer can affect how much heat is extracted from a deposition region, the layer height can affect cooling, solidification, and ultimately, the microstructure. One of the parameters that may be controlled is a target height of the deposited layer, which may affect the three dimensional distribution of heat within the layer. Thus, the target height may be set based on a target microstructure.

High temperature components being processed by directed energy deposition may include metals, alloys, or superalloys, and the components may have a microstructure. The microstructure of a region of a component includes the arrangement of phases and defects within the region, and may result from phenomena such as crystallization, solidification, and phase separation. Microstructure may thus include phase compositions, grain geometries, grain boundaries, defects, and precipitates within a region. Microstructure may include features having dimensions ranging from nanometers to centimeters, and may be visible with or without magnification. Thus, in some examples, substrate regions that have the same phase composition may nonetheless have a different microstructure, for example, because of differences in grain sizes. In some examples, substrate regions that have the same or similar grain geometry may nonetheless have a different microstructure, for example, because of differences in the phase composition. Thus differences in microstructure may result from differences in one or both of phase composition, material composition, the nature and concentration of impurities, concentration gradients of a major or a minor phase, or grain geometry. Microstructural features may include volume fraction of phases, microconstituents, or grain morphology, extent of recrystallization or grain growth.

By controlling a directed energy deposition technique based at least in part on a target layer height, example systems and techniques according to the disclosure may be used to process a component, for example, repairing a region of the component, while maintaining or achieving a target microstructure within the region of the component being processed, which may provide target mechanical properties while limiting flaws such as lack of fusion, pores, or cracks.

FIG. 1A is a conceptual and schematic block diagram illustrating an example system 10 for directed energy deposition. System 10 includes a component 12, an energy source 14, a material delivery device 20, and a computing device 30. Component 12 may include any structure to which material is added using directed energy deposition. For example, component 12 may include a gas turbine engine component, such as, a turbine blade or a turbine vane. Similarly, component 12 may include structural features and geometry of any size, shape, or both. In some examples, component 12 may exhibit features having dimensions from about 0.001 inches to about 0.5 inches.

Component 12 may be formed of any material to which material may be added using directed energy deposition or material addition. In some examples, such as some examples in which component 12 include a gas turbine engine component, component 12 may include a metal or alloy substrate. For example, component 12 may include one or more of nickel, cobalt, nickel alloys, cobalt alloys, superalloys, or their combinations. Component 12 may include single crystal or polycrystalline materials. For example, component 12 may include magnesium based, nickel based, ferrous, and titanium alloys. An example of a single crystal nickel based alloy is CMSX-4. In some examples, the alloys may include alloying additions including at least one of Mn, Mg, Cr, Si, Co, W, Ta, Al, Ti, Hf, Re, Mo, Ni, Fe, B, Nb, V, C, and Y. In other examples, component 12 may include a polymeric substrate or the like.

Component 12 may be fabricated using any suitable technique for manufacturing metal or alloy components. For example, component 12 may be fabricated using at least one of casting, molding, stamping, cutting, punching, milling, etching, welding, or other metal working techniques. In an example, component 12 may be fabricated using directed energy deposition. For example, directed energy deposition may be used to deposit a plurality of layers of a material, each layer of the plurality of layers having a predetermined two-dimensional geometry. The plurality of layers may be stacked to provide a predetermined three dimensional geometry to component 12 by material addition. While directed energy deposition may be used to fabricate component 12, directed energy deposition may also be used to modify or repair component 12, for example, a damaged part of component 12.

Damage to component 12, for example, damage that affects geometry or mechanical properties of features or regions of component 12, may affect the performance of component 12 as a whole, and thus need repair. In some examples, even if component 12 is not damaged, component 12 may be modified due to changes in specifications or design parameters, or because of changes in the environment in which component 12 is to be deployed. Material addition, for example, using directed energy deposition, may be used to repair or modify component 12. However, material addition at a region of component 12 may affect the microstructure in the region of component 12. For example, prior to the material addition, component 12 may exhibit an initial microstructure that may be uniform throughout component 12 or may be different in different regions or zones of component 12. Component 12 may have an initial microstructure in a deposited region 28, e.g., upon initial manufacture of component 12, before the damage to component 12 requires repair, or before modifications to component 12 are anticipated. Thus, in some examples, deposition region 28 may include a repair region or a modification region. Example systems and techniques according to the disclosure may be used to perform modification or repairs in deposited region 28 while substantially maintaining the initial microstructure, or while obtaining a target microstructure within deposited region 28, while reducing or substantially avoiding the development of flaws or unwanted changes to the microstructure.

In some examples, deposited region 28 may include at least one of a surface region, a subsurface region adjacent the surface region, and a bulk region adjacent the subsurface region. The predetermined microstructure may produce mechanical and/or chemical properties that are substantially the same as the original deposited region 28 of component 12. For example, the microstructure may be substantially the same as the original portion of the component being modified or repaired or may be a microstructure resulting in substantially the same mechanical and/or chemical properties as the original portion of component 12 that is being modified or repaired.

In some examples, component 12 may include a gas turbine engine component. For example, component 12 may include a shroud, a seal fin, a platform, an airfoil, or the like. Thus, example systems and techniques described herein may be used to repair damage to various gas turbine engine components, for example, by restoring damaged components so that they conform to predetermined specifications.

In some examples, computing device 30 may control the position and orientation of component 12, for example, by controlling an industrial robot, a movable platform, or a multi-axis stage supporting component 12. Thus, computing device 30 may expose target regions, such as deposited region 28, to energy source 14 for processing as described below. Computing device 30 may move component 12 before, during, or after performing repair techniques described herein. For example, computing device 30 may move component 12 during pre-processing, during directed energy deposition, or during post-processing, for example, to expose different regions of component 12 to different processing environments.

Computing device 30 may control energy source 14. Energy source 14 may include a power source such as a laser source or an electron beam source (not shown) and output an energy beam 16 directed at component 12. Thus, in some examples, energy beam 16 may include a laser beam, an electron beam, or another form of focused energy absorbable by the material of component 12, the material to be added to component 12, or both, and sufficiently strong to heat the material to sinter or melt. In some examples, energy beam 16 may include both the laser beam and the electron beam.

In some examples, energy source 14 may include laser sources including a gas, solid-state, semiconductor, dye, or any other laser that may be used for directed energy deposition. In some examples, energy source 14 may include an electron beam that includes a beam of electrons controlled by electronic and magnetic fields. In some examples, for example, where energy beam 16 includes an electron beam, system 10 may at least partially or wholly be under a reduced pressure or a vacuum. Computing device 30 may control the position and orientation of energy source 14 and energy beam 16, for example, by controlling an industrial robot or a movable platform supporting energy source 14, or by controlling an optical path of energy beam 16 by controlling optical media such as reflectors, refractors, filters, and the like.

Computing device 30 may control various parameters of energy source 14, including the instantaneous power, peak power or intensity, power pulsing, average beam power, a peak beam power density, a beam heat input, travel speed, wavelength, direction, and orientation of. Energy beam 16 may be focused or directed by focusing lens 18 along or on a first path. Thus, computing device 30 may control energy source 14 to advance energy beam 16 along a first path to form an advancing molten pool on component 12.

Computing device 30 may control material delivery device 20 that delivers a material stream 22 along the first path. Computing device 30 may control the position and orientation of material delivery device 20 and material stream 22, for example, by controlling an industrial robot, a movable platform, or a multi-axis stage that supports material delivery device 20. Material stream 22 may include fluid, powder, wire, particles, suspension, inert gas, or any other form of material that is susceptible to energy beam 16 to be deposited on component 12. For example, material stream 22 may include ceramic or metallic powders. In some examples, material stream 22 may include nickel, iron, or titanium alloys and optionally one or more alloying additions including one or more of Mn, Mg, Cr, Si, Co, W, Ta, Al, Ti, Hf, Re, Mo, Ni, Fe, B, Nb, V, C, and Y. In some examples, material stream 22 may include powders including one or more of polycrystalline nickel base superalloys or cobalt base superalloys, such as an alloy including NiCrAlY or CoNiCrAlY. For example, material stream 22 may include an alloy that includes 9 to 10.0 wt % W, 9 to 10.0 wt % Co, 8 to 8.5 wt % Cr, 5.4 to 5.7 wt % Al, about 3.0 wt % Ta, about 1.0 wt % Ti, about 0.7 Mo, about 0.5 Fe, about 0.015 B and balance Ni, available under the trade designation MAR-M-247, from MetalTek International, Waukesha, Wis. In some examples, material stream 22 may include an alloy that includes 22.5 to 24.35 wt % Cr, 9 to 11 wt % Ni, 6.5 to 7.5 wt % W, less than about 0.55 to 0.65 wt % of C, 3 to 4 wt % Ta, and balance Co, available under the trade designation MAR-M-509, from MetalTek International, Waukesha, Wis. In some examples, material stream 22 may include an alloy that includes 19 to 21 wt % Cr, 9 to 11 wt % Ni, 14 to 16 wt % W, about 3 wt % Fe, 1 to 2 wt % Mn, and balance Co, available under the trade designation L605, from Rolled Alloys, Inc., Temperance, Mich. In some examples, a powder in material stream 22 may include a chemically modified version of MAR-M-247 that includes less than 0.3 wt % C, between 0.05 and 4 wt % Hf, less than 8 wt % Re, less than 8 wt % Ru, between 0.5 and 25 wt % Co, between 0.0001 and 0.3 wt % B, between 1 and 20 wt % Al, between 0.5 and 30% Cr, less than 1 wt % Mn, between 0.01 and 10 wt % Mo, between 0.1 and 20% Ta, and between 0.01 and 10 wt % Ti. In some examples, a powder in material stream 22 may include a nickel based alloy available under the trade designation IN-738 or Inconel 738, or a version of that alloy, IN-738 LC, available from All Metals & Forge Group, Fairfield, N.J., or a chemically modified version of IN-738 that includes less than 0.3 wt % C, between 0.05 and 7 wt % Nb, less than 8 wt % Re, less than 8 wt % Ru, between 0.5 and 25 wt % Co, between 0.0001 and 0.3 wt % B, between 1 and 20 wt % Al, between 0.5 and 30% Cr, less than 1 wt % Mn, between 0.01 and 10 wt % Mo, between 0.1 and 20% Ta, and between 0.01 and 10 wt % Ti. In some examples, material stream 22 may include an alloy that includes 5.5 to 6.5 wt % Al, 13 to 15 wt % Cr, less than 0.2 wt % C, 2.5 to 5.5 wt % Mo, Ti, Nb, Zr, Ta, B, and balance Ni, available under the trade designation IN-713 from MetalTek International, Waukesha, Wis.

In some examples, the material delivered by material delivery device 20 may include a composition substantially the same as (e.g., the same or nearly the same as) the composition of the material from which component 12 is formed. In other examples, the material delivered by material delivery device 20 may include a composition different from the composition of the material from which component 12 is formed.

Material delivery device 20 may include one or more delivery ports or delivery nozzles through which material exits material delivery device 20. Computing device 30 may control material delivery device 20 to deliver material in material stream 22 to the advancing molten pool formed by advancing energy source 14 along the first path. For example, powder may be delivered via conical shaped stream through a powder delivery annulus directed towards the advancing molten pool. Computing device 30 may control a material flux of the material stream 22. For example, material flux may be controlled by controlling a powder delivery standoff distance (distance from the lowest point of a delivery nozzle parallel to the gravitational vector to the surface of component 12). In some examples, the powder delivery nozzle standoff distance may influence the powder flux falling on a given area of the molten pool per unit time, as the powder stream exiting the delivery nozzle may diverge as the powder exits the nozzle. In some examples, the powder delivery nozzle standoff distance may be between about 0.05 inches and about 4 inches, and the powder feed rate may be maintained between about 0.1 g/min and about 20 g/min. For example, the delivery standoff distance may depend on the angle of the powder stream symmetry axis relative to the surface of component 12, the powder delivery nozzle exit hole diameter, and the angle of divergence of the powder streams exiting the powder delivery nozzle. In some examples, material delivery device 20 may include a plurality of nozzles such that a powder having a converging profile is delivered by material delivery device 20. For example, each nozzle of the plurality of nozzles may be substantially directed towards a target delivery zone.

Energy beam 16 may transform one or more of a physical state, a composition, ionization, or another property of one or both of component 12 or material in material stream 22 along the first path leading to the deposition of a first raised track 24a on at least a surface of deposited region 28. In some examples, energy beam 16 may melt a surface of component 12 along the first path to form a molten portion or molten pool. Material delivery device 20 may deliver material from material stream 22 to the molten portion, where the material may melt in the molten portion to form a combined molten composition, which may solidify to form the first raised track 24a. Thus, energy beam 16 may transform material from material stream 22 into a sintered, fused, or molten state by contact with the molten pool. In some examples, energy beam 16 may be directly incident on a portion of material stream 22 and may directly fuse or melt the portion of material stream 22 before it is deposited on component 12. In some examples, material from one or both of material stream 22 or component 12 may only melt or fuse within a focal region or substantially near a focal region of energy beam 16. For example, material delivery device 20 may deliver a material along the first path, and computing device 30 may focus energy beam 16 from energy source onto the material, so that material and component 12 along the first path simultaneously melt to form a molten region. Thus, in some examples, the first raised track 24a may be formed substantially along the first path.

Figure 1D:
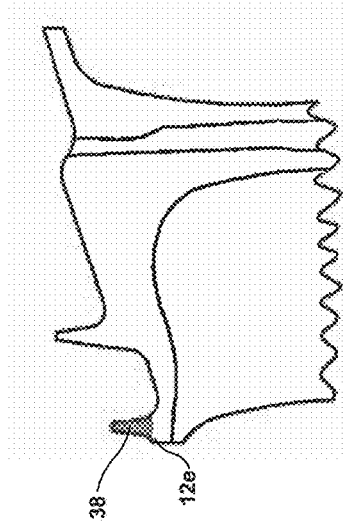
FIG. 1D is a conceptual diagram illustrating an example article modified by directed energy deposition.
Figure 1C:
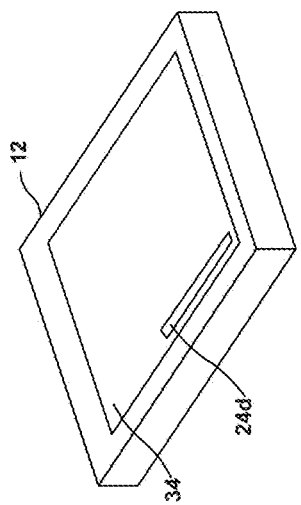
FIG. 1C is a conceptual diagram illustrating an example article modified by directed energy deposition.
Figure 1E:
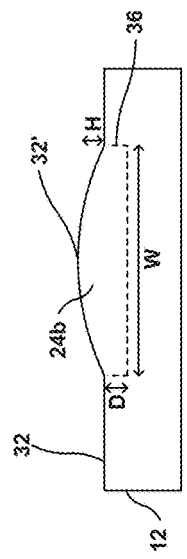
FIG. 1E is a conceptual diagram illustrating a high temperature gas turbine engine component modified by directed energy deposition.
Figure 1B:
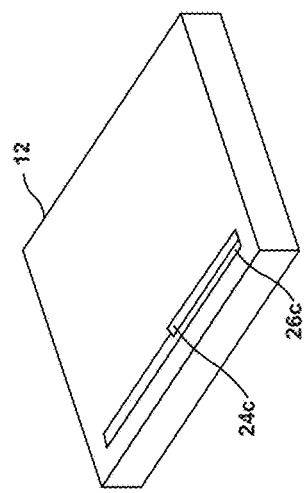
FIG. 1B is a conceptual cross-sectional diagram illustrating an example article modified by directed energy deposition.

FIG. 1B is a conceptual diagram illustrating an example article modified by directed energy deposition. A first raised track 24b may be deposited within deposited region 28 on component 12 by example system 10 of FIG. 1A. First raised track 24b may have a width W, a depth D, and an actual height H, as shown in FIG. 1B. The depth D may be measured within a subsurface region immediately adjacent a surface 32 of component 12. Actual height H may be measured as a distance between surface 32 of component and a track surface 32' of first raised track 24b. For example, first raised track 24b may exhibit a curved surface in a direction transverse the first path, and the curved surface may exhibit a peak at or adjacent a center of first raised track 24b. Computing device 30 may control various dimensions of first raised track 24b, including W, D, H, track surface 32', similar to that of raised track 24a of FIG. 1A. Computing device 30 may control the dimensions of first raised track 24b, for example, based on a target height of first raised track 24b. The target height of first raised track 24b may depend on the intended thickness of a layer to be ultimately deposited by example system 10 using directed energy deposition on deposited region 28. In some examples, the actual height H may deviate from the target height, for example, by more than or within $\pm 0.01\%$, $\pm 0.1\%$, $\pm 1\%$, $\pm 10\%$, or $\pm 20\%$, because of process deviations from target specifications that may affect the geometry of the molten pool, the amount of material delivered to the molten pool, and eventually the dimensions of one or more raised tracks that ultimately form the layer having the actual height. For example, one or more of pause time, hatch spacing, average beam power, peak beam power density, beam heat input, a ratio of a molten pool depth to the nominal height, material flux of the material, or displacement between the beam spot and the first path may deviate from their target ranges, resulting in deviation of the actual height from the target height.

Computing device 30 may at least one of control energy source 14, material delivery device 20, and the position or orientation of component 12 to deposit a series of raised tracks within deposited region 28 on component 12. Thus, in some examples, a layer deposited on component 12 may include a plurality of raised tracks, and the plurality of raised tracks may include first raised track 24a and a second raised track 26a. First raised track 24a may be adjacent second raised track 26a. Second raised track 26a may be formed along a second path. In some examples, computing device 30 may control the geometry or dimensions of first raised track 24a, second raised track 26a, the plurality of raised tracks, or of the layer, for example, by controlling one or more of component 12, energy source 14, or material delivery device 20.

The target height of the layer to be deposited in region 28 may be predetermined based on a target microstructure within one or more of first raised track 24a, second raised track 26a, deposited region 28, the layer, or a region of component 12, since the target microstructure may depend on energy transfer rates, temperature gradients, heating rates, and cooling rates within region 28. As discussed above, the actual height may deviate from the target height. For example, the actual height may influence rate of heat extraction and cooling, which may affect solidification, and ultimately, the resultant microstructure. Further, parameters that cause the actual height to deviate from the target height may also affect the temperature profile in region 28. For example, deviations in one or more of pause time, hatch spacing, average beam power, peak beam power density, beam heat input, a ratio of a molten pool depth to the nominal height, material flux of the material, or displacement between the beam spot and the first path may affect the rate of heat flow between different regions in region 28, which may affect the local temperature profile within component 12.

Computing device 30 may control a cooling rate within deposited region 28 by controlling one or more of energy source 14, material device 20, and component 12, for example, by allowing one raised track of the plurality of raised tracks to cool before depositing another raised track of the plurality of raised tracks. As discussed above, the cooling rate may regulate the resultant microstructure. In some examples, computing device 30 may control a pause time between forming first raised track 24a and forming the second raised track 26a to control the cooling rate. In some examples, computing device 30 may control a hatch spacing between first raised track 24a and second raised track 26a. The hatch spacing may be the spacing between the first path and the second path, or the minimum spacing between the respective centers of first raised track 24a and second raised track 26a, or the minimum spacing between respective crests or peaks of first raised track 24a and second raised track 26a. In some examples, the hatch spacing may be the minimum spacing between the paths of two successively deposited raised tracks of the plurality of raised tracks. In some examples, one or both of controlling the pause time and controlling the hatch spacing may regulate one or more of a molten pool temperature, a subsurface temperature of a subsurface region of component 12 in or adjacent deposited region 28, and a surface temperature of a surface region of component 12 in or adjacent deposited region 28. For example, increasing the pause time may allow first raised track 24a and portions of component 12 near first raised track 24a to cool before second raised track 26a is formed, and reducing the pause time may allow first raised track 24a and portions of component 12 near first raised track 24a to maintain heat while second raised track 26a is formed. In some examples, increasing the hatch spacing may reduce heat transfer between a region adjacent first raised track 24a and a region adjacent second raised track 26a, and reducing the hatch spacing may increase heat transfer between a region adjacent first raised track 24a and a region adjacent second raised track 26a. For example, increasing the hatch spacing may increase a distance between first track 24a and second raised track 26a, thus increasing a volume of material available to dissipate heat, reducing the effective temperature increase of the portion of component 12 near second raised track 24b due to heat from first raised track 24a. Thus, the pause time and the hatch spacing may affect the extent to which a region adjacent first raised track 24a may draw heat from or contribute heat to a region adjacent second raised track 26a, for example, at least one of a molten pool formed along second raised track 26a, a subsurface temperature of a subsurface region adjacent second raised track 26a, or a surface temperature of a surface region adjacent second raised track 26a.

In some examples, computing device 30 may attempt to minimize the deviation of the actual height from the target height. For example, system 10 may include one or more sensors (not shown) that may capture data including temperatures along the energy beam, along the first path, at different regions on the surface or in subsurface regions of component 12, adjacent the molten pool, first raised track 24a, or second raised track 26a, or that may capture locations, orientations, and dimensions of one or more of the molten pool, first raised track 24a, second raised track 26a, or deposited region 28. In some examples, the sensors may include a light sensor, a heat sensor, a visible light sensor, an ultraviolet sensor, an infrared sensor, a laser scanner, an electron-beam scanner, a CCD (charge-coupled device), or a camera. Computing device 30 may analyze data captured by the sensors to compare the progress of the deposition and to evaluate deviation of individual parameters from the specified targets, and the deviation of the actual height from the target height. In some examples, if computing device 30 senses a deviation in a first parameter of a plurality of parameters and a consequent deviation in the target height, computing device 30 may compensate for the deviation by changing the magnitude of a second parameter of the plurality of parameters to reduce the deviation of the actual height from the target height. For example, if computing device 30 senses an decrease in the actual height, computing device may reduce the pause time, so that a greater amount of heat is retained within the local repair volume during deposition of subsequent tracks, which may promote melting, and thus increase the actual height. As another example, reducing the material flux of the material may reduce the amount of material added to the molten pool within a local region and which eventually solidifies, thus reducing the actual height. Increasing the hatch spacing may reduce the actual height. Increasing the pause time may reduce the actual height. Increasing the average beam power may increase the actual height. Increasing the peak beam power density may increase the actual height. Increasing the beam heat input may increase the actual height. Increasing a ratio of a molten pool depth to the nominal height may reduce the actual height.

As discussed above, the actual height may affect the cooling rate and resulting solidification within deposited region 28, and the cooling rate affects the microstructure. Thus, in some examples, computing device 30 may control the actual height to eventually control the microstructure. Thus, in some examples, computing device 30 may control one or more of component 12, energy source 14, and material delivery device 20, based on the target height of the layer, to control the microstructure within deposited region 28.

FIG. 1C is a conceptual diagram illustrating an example article modified by directed energy deposition. As shown in FIG. 1C, a second raised track 26c may at least partially overlap at least part of a first raised track 24c, for example, the region of overlap between first raised track 24c and second raised track 26c may be at least 1%, 5%, 10%, 20%, 30%, or 50% of the width W. In some examples, second raised track 26c may substantially overlap first raised track 24c, for example, at least 90%, 95% or at least 99% of first raised track 24c. In some examples, the second path along which second raised track 26c is deposited may be oriented in the same direction as the first path along which first raised track 24c is deposited. In some examples, the second path along which second raised track 26c is deposited may be oriented in a different direction, for example, 30°, 45°, 90°, 180°, or any other relative direction compared to the direction of the first path along which first raised track 24c is deposited.

FIG. 1D is a conceptual cross-sectional diagram illustrating an example article modified by directed energy deposition. In some examples, component 12 may have a layer 34 that was previously deposited, for example, by directed energy deposition or by any other suitable technique. System 10 may deposit a first raised track 24d on the layer 34. In some examples, system 10 may deposit a second layer including a second plurality of raised tracks on layer 34. In some examples, system 10 may successively deposit a series of layers on component 12. In some examples, system 10 may deposit some of the layers by directed energy deposition, and deposit other layers by other suitable techniques. In some examples, system 10 may initiate deposition of subsequent layers at different locations within the same zone or region within deposited region 28 compared to layer 34, and system 10 may initiate deposition of a subsequent layer in any location within region 28 or along the periphery of the deposited region 28.

FIG. 1E is a conceptual diagram illustrating a high temperature gas turbine engine component 12e modified by an example directed energy deposition technique. A repair volume 38 deposited on component 12e may include a plurality of layers, each layer of the plurality of layer including at least one raised track. In some examples, repair volume 38 could assume any suitable three-dimensional shape as required to repair component 12e to a target operating geometry or shape. Thus, an area of component 12e, for example, a turbine blade sealing feature, that may have suffered from wear may be repaired by adding material to the worn region to restore component 12e to restore a nominal geometry, that may include repair volume 38.

Figure 2:
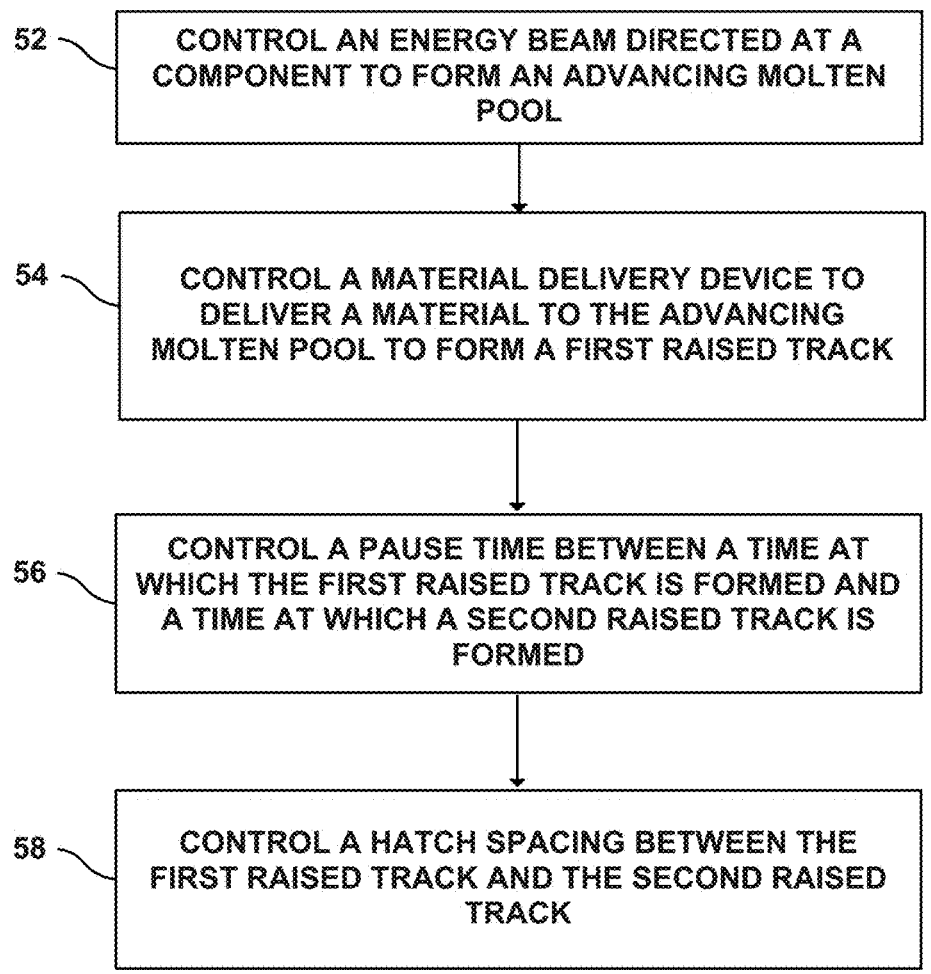
FIG. 2 is a flow diagram illustrating an example technique for directed energy deposition.

FIG. 2 is a flow diagram illustrating an example technique for directed energy deposition. The example technique of FIG. 2 may be performed by example system 10 of FIG. 1A, and is described in some examples below with reference to example system 10 of FIG. 1A. However, in some examples, one or more steps of the example technique of FIG. 2 may be performed by other example systems described in the disclosure. The example technique may include controlling, by computing device 30, based on a target height of layer 34 to be deposited on a component 12 by directed energy deposition, energy source 14 directed at component 12 (52). Controlling energy source 14 may include controlling, by computing device 30, energy source 14 to advance energy beam 16 along a first path to form an advancing molten pool on component 12. The example technique may include controlling, by computing device 30, material delivery device 20 (54). Computing device 30 may control material delivery device 20 to delivering a material, for example, material stream 22, to the advancing molten pool. Material delivery device 20 may deliver material by material stream 22 that may lead, accompany, or lag energy beam 16. Thus, in some examples, material stream 22 may deliver material before energy source 14 melts a leading front along the first path to form the leading edge of the advancing molten pool. In some examples, material stream 22 may deliver material simultaneously with the incidence of energy beam 16 on component 12. In some examples, material stream 22 may deliver material at a region along the first path after energy beam 16 has passed the region. In some examples, the material may combine with the advancing molten pool to form first raised track 24a having an actual height. In some examples, layer 34 may include first raised track 24a. In some examples, deposited region 28 of component 12 includes layer 34. In some examples, the actual height may regulate a resultant microstructure within deposited region 28. In some examples, computing device 30 may select a target height from between about 0.001 inches and 1 inch. For example, computing device 30 may select the target height such that the ratio of the track height to the track depth D is within a predetermined range. In some examples, computing device 30 may select the target height such that the ratio of the track height to the molten pool depth is between about 0.001 and about 1000.

In some examples, the example technique of FIG. 2 may include optional preparatory or pre-processing steps, such as cleaning an entire surface of component 12 or a selected region of component 12 such as surface of deposited region 28 to remove oils, contaminants, coatings or other material that may interfere with the repair process. The example technique may optionally include machining component 12 to produce a suitable surface on deposited region 28. The shape of the machined deposited region 28 may thus provide a line of sight for energy beam 16 and for delivery of material through material stream 22. In some examples, component 12 may be preheated. In some examples, the example technique of FIG. 2 may include optional post-processing steps including one or more of machining, HIP-ing (hot isostatic processing), heat treatment, surface blasting, and coating.

In some examples, the example technique of FIG. 2 may further include controlling, by computing device 30, a cooling rate within deposited region 28, by controlling material delivery device 20 and energy source 14. In some examples, the cooling rate may regulate the resultant microstructure to avoid or limit flaws in the microstructure while still providing target mechanical properties. Flaws to be avoided may include lack of fusion, pores, and cracks. In some examples, by controlling the temperature of at least a portion of component 12, computing device 30 may be configured to control mechanical and chemical properties, which ultimately may metallurgical properties such as hardness, shear and tensile stress, work hardening, grain size and boundaries, rigidity, and stiffness of the repaired portion of component 12. For example, computing device 30 may be configured to control of the temperature of the deposited region 28 of component 12 to control a heat treatment process of the deposited region 28, which may affect the microstructure of the at least a portion of component 12. Computing device 30 may be configured to control of the temperature of the deposited region 28 of component 12 to control a heat treatment process of the at least a portion of component 12 to substantially reproduce (e.g., reproduce or nearly reproduce) the originally manufactured mechanical and/or chemical properties of component 12 by producing a predetermined microstructure. For example, the microstructure may be substantially the same as the original portion of the component being repaired or may be a microstructure resulting in substantially the same material mechanical and/or chemical properties as the original portion of component 12.

In some examples, computing device 30 may also control hatch length. Hatch length may be a distance along which energy beam 16 travels along the first path during a period of activation, after which energy beam 16 may be deactivated. In some examples, the hatch length may be between about 0.01 inches to 10 inches. Material delivery device 20 may or may not be deactivated when energy beam 16 is deactivated. The time for which energy beam 16 is deactivated or motionless may be characterized as a pause time. In some examples, the example technique of FIG. 2 may optionally further include, by computing device 30, controlling a pause time between forming first raised track 24a and forming second raised track 26a (56). In some examples, controlling the cooling rate may thus include controlling the pause time. In some examples, the pause time may be between about 0.1 seconds to about 200 seconds. In some examples, the example technique of FIG. 2 may optionally further include, by computing device 30, controlling a hatch spacing between first raised track 24a and second raised track 26a (58). In some examples, the hatch spacing may be between 0.001 inches and 1 inch. In some examples, controlling the pause time and controlling the hatch spacing may regulate one or more of a molten pool temperature, a subsurface temperature of a subsurface region of the component within the deposited region, and a surface temperature of a surface region of the component within the deposited region. For example, hatch spacing may serve to mitigate repair flaws, for example, lack of fusion, and may affect the three dimensional temperature field of the repair. In some examples, the control of energy source 14 by computing device 30 may include controlling one or more of an average laser power, a peak laser power density, a laser heat input, a ratio of a molten pool depth to the nominal height, and a material flux of the material. In some examples, laser power applied at surface of component 12 by energy source 14 may be maintained between 50 W and 1000 W. The laser spot size may be selected to achieve a peak laser power density on the order of $1\times10^3$ W/cm$^2$ to $1\times10^6$ W/cm$^2$. Travel speed may be selected to limit linear heat input to between 1 to 500 J/mm, where heat input is the ratio of the laser power in Watts to the travel speed in mm/s.

In some examples, the first path may follow any suitable direction or tool path along a surface of component 12. Thus, in some examples, the example technique of FIG. 2 may include forming first track 24a along any suitable direction by advancing energy source 14 along a first direction. Similarly, forming second track 26a may include advancing energy source 14 along a second direction. In some examples, the second direction may be opposite the first direction. In some examples, the second direction may be along any suitable angle with respect to the first direction. In some examples, the example technique of FIG. 2 may include forming a series of tracks or a tool path that may eventually cover deposited region 28 to form layer 34. The tool path used to form layer 34 on component 12 may affect instantaneous volumetric heat content of the repair. For example, accumulation of heat within a deposited region may influence solidification and cooling rates. In turn, the solidification and cooling rates may establish grain morphology and various solid state phase transformations which may change throughout the process of laser deposition. In some examples, the three dimensional heat distribution within deposited region 28 and layer 34 may be managed using a predetermined tool path strategy that may include a target height. The tool path strategy may including contouring and hatching.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

EXAMPLES

Example 1

Figure 3:
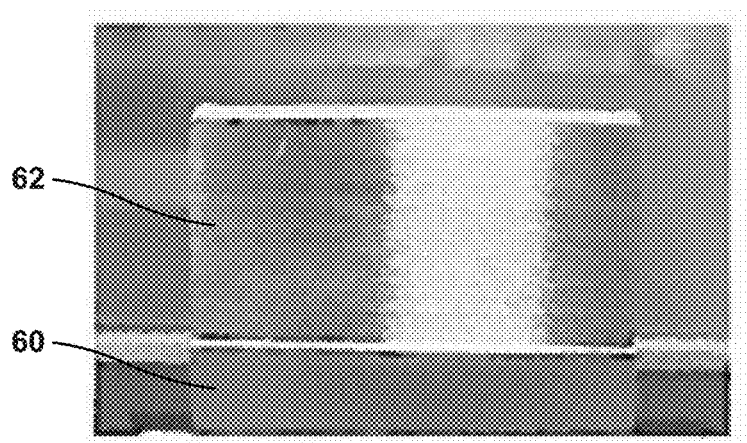
FIG. 3 is a photograph of an example article modified by laser directed energy deposition.

FIG. 3 is a photograph of an example article modified by laser directed energy deposition. A thin section 60 of a component was repaired by depositing repair volume 62 on the component.

Example 2

Figure 4A:
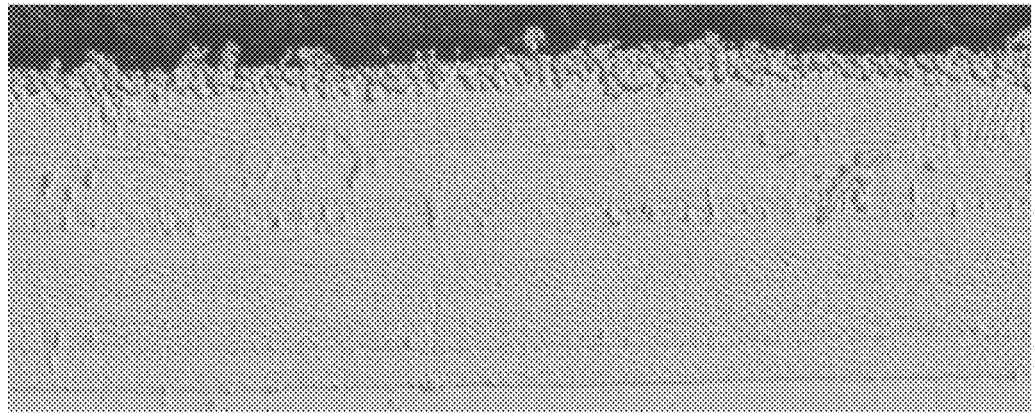
FIGS. 4A and 4B are photographs of example articles modified by laser directed energy deposition.
Figure 4B:
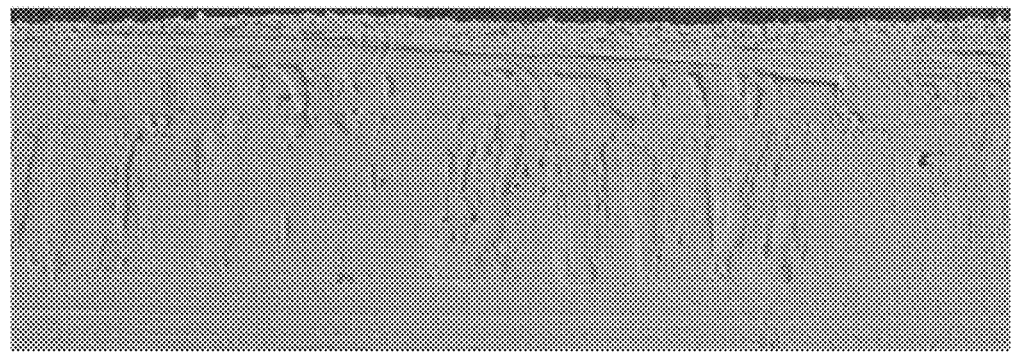

The effect of changing the pause time in laser directed energy deposition on a nickel based superalloy was evaluated. FIGS. 4A and 4B are photographs of example articles including a nickel based superalloy modified by laser directed energy deposition having the same laser peak power density ($8 \times 10^4$ W cm$^{-2}$), travel speed, target height, and hatch spacing, with only the pause time being changed. The pause time used in the laser directed energy deposition in the example article shown in FIG. 4B was 500% greater than in the example article shown in FIG. 4A. Spurious grains such as columnar grains were reduced in FIG. 4A compared to FIG. 4B, showing that decreasing the pause time improved the resultant microstructure of the substrate.

Example 3

Figure 5A:
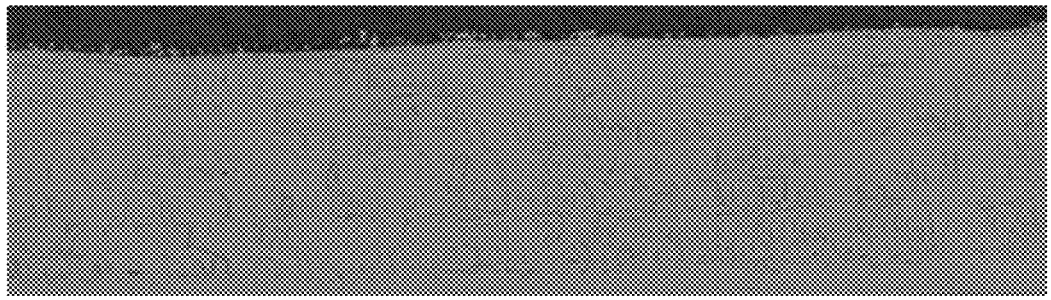
FIGS. 5A and 5B are photographs of example articles modified by laser directed energy deposition.
Figure 5B:
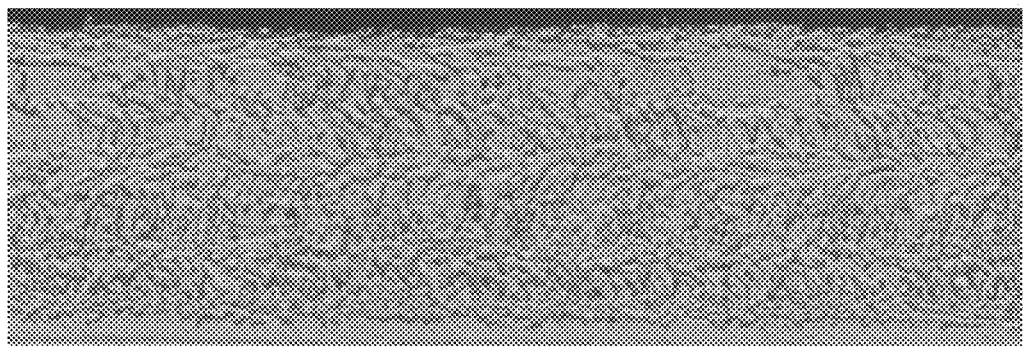

The effect of changing the hatch spacing in laser directed energy deposition on a nickel based superalloy was evaluated. FIGS. 5A and 5B are photographs of example articles including a nickel based superalloy modified by laser directed energy deposition having the same laser peak power density ($2 \times 10^4$ W cm$^{-2}$), travel speed, target height, and pause time, with only the hatch spacing being changed. The hatch spacing used in the laser directed energy deposition in the example article shown in FIG. 5B was 30% greater than in the example article shown in FIG. 5A. A finer grain structure was observed in FIG. 5B compared to FIG. 5A, showing that increasing the hatch time improved the resultant microstructure of the substrate.

Example 4

Figure 6A:
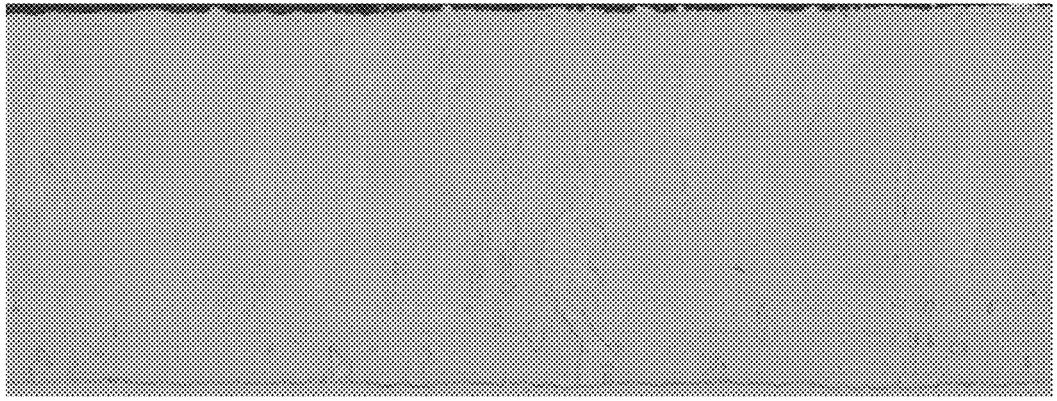
FIGS. 6A and 6B are photographs of example articles modified by laser directed energy deposition.
Figure 6B:
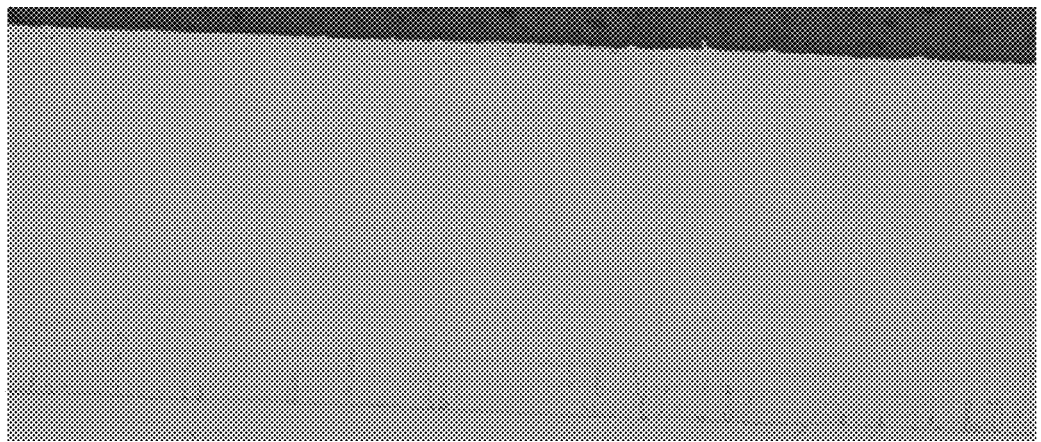

The effect of changing the target height in laser directed energy deposition on a cobalt based superalloy was evaluated. FIGS. 6A and 6B are photographs of example articles including a cobalt based superalloy modified by laser directed energy deposition having the same laser peak power density ($8 \times 10^4$ W cm$^{-2}$), travel speed, target height, hatch spacing, and pause time, with only the target height (nominal layer thickness) being changed. The target height used in the laser directed energy deposition in the example article shown in FIG. 6B was 100% greater than in the example article shown in FIG. 6A. While relatively long columnar grains were observed in the example article of FIG. 6A, a finer grain structure was observed in FIG. 6B compared to FIG. 6A, showing that increasing the target height improved the resultant microstructure of the substrate.

Various examples have been described. These and other examples are within the scope of the following claims.

The invention claimed is:

1. A method comprising:
controlling, by a computing device, based on a set target height of a layer comprising a first raised track to be deposited on a component by directed energy deposition, an energy source directed at the component to advance an energy beam along a first path to form an advancing molten pool on the component;
controlling, by the computing device, based on the set target height of the layer, a material delivery device to deliver a material to the advancing molten pool, wherein the material combines with the advancing molten pool to form the first raised track having an actual height, wherein a deposited region of the component comprises the layer, and wherein the actual height affects a resultant microstructure within the deposited region; and controlling, by the computing device, a cooling rate within the deposited region by controlling the material delivery device, the energy source, a pause time between a first time at which the first raised track is formed and a second time at which a second raised track is formed, and a hatch spacing between the first raised track and the second raised track, wherein the layer comprises the second raised track laterally adjacent to the first raised track, wherein controlling the hatch spacing affects at least one of a molten pool temperature, a subsurface temperature of a subsurface region of the component within the deposited region, or a surface temperature of a surface region of the component within the deposited region, wherein controlling the pause time affects at least one of a molten pool temperature, a subsurface temperature of the subsurface region of the component within the deposited region, or a surface temperature of the surface region of the component within the deposited region, and wherein the cooling rate regulates the resultant microstructure within the deposited region.

2. The method of claim 1, further comprising controlling, by the computing device, at least one of an average beam power, a peak beam power density, a beam heat input, a ratio of a molten pool depth to the set target height, or a material flux of the material.

3. The method of claim 1, wherein the first raised track at least partially overlaps the second raised track.

4. The method of claim 1, wherein the first raised track substantially overlaps the second raised track.

5. The method of claim 1, wherein forming the first raised track comprises advancing the energy beam along a first direction, and wherein forming the second raised track comprises advancing the energy beam along a second direction opposite the first direction.

6. The method of claim 1, wherein the energy beam comprises a laser beam or an electron beam.

7. A system comprising:
an energy source;
a material delivery device; and
a computing device, wherein the computing device is configured to:
control, based on a set target height of a layer comprising a first raised track to be deposited on a component by directed energy deposition, the energy source directed at the component to advance an energy beam along a first path to form an advancing molten pool on the component; and
control, based on the set target height of the layer, the material delivery device to deliver a material to the advancing molten pool, wherein the material combines with the advancing molten pool to form the first raised track having an actual height, wherein a deposited region of the component comprises the layer, and wherein the actual height regulates a resultant microstructure within the deposited region; and
control a cooling rate within the deposited region by controlling the material delivery device, the energy source, a pause time between a first time at which the first raised track is formed and a second time at which a second raised track is formed, and a hatch spacing between the first raised track and a second raised track, wherein the layer comprises the second raised track laterally adjacent to the first raised track, wherein controlling the hatch spacing affects at least one of a molten pool temperature, a subsurface temperature of a subsurface region of the component within the deposited region, or a surface temperature of a surface region of the component within the deposited region, wherein controlling the pause time affects at least one of the molten pool temperature, the subsurface temperature of the subsurface region of the component within the deposited region, or the surface temperature of the surface region of the component within the deposited region, and wherein the cooling rate regulates the resultant microstructure within the deposited region.

8. The system of claim 7, wherein the computing device is further configured to control at least one of an average beam power, a peak beam power density, a beam heat input, a ratio of a molten pool depth to the set target height, or a material flux of the material.

9. The system of claim 7, wherein the energy beam comprises a laser beam or an electron beam.

10. A non-transitory computer readable storage medium comprising instructions that, when executed, cause at least one processor to:
control, based on a set target height of a layer comprising a first raised track to be deposited on a component by directed energy deposition, an energy source directed at the component to advance an energy beam along a first path to form an advancing molten pool on the component;
control, based on the set target height of the layer, a material delivery device to deliver a material to the advancing molten pool, wherein the material combines with the advancing molten pool to form the first raised track having an actual height, wherein a deposited region of the component comprises the layer, and wherein the actual height affects a resultant microstructure within the deposited region; and
control a cooling rate within the deposited region by controlling the material delivery device, the energy source, a pause time between a first time at which the first raised track is formed and a second time at which a second raised track is formed, and a hatch spacing between the first raised track and the second raised track, wherein the layer comprises the second raised track laterally adjacent to the first raised track, wherein controlling the hatch spacing affects at least one of a molten pool temperature, a subsurface temperature of a subsurface region of the component within the deposited region, or a surface temperature of a surface region of the component within the deposited region, wherein controlling the pause time affects at least one of the molten pool temperature, the subsurface temperature of the subsurface region of the component within the deposited region, or the surface temperature of the surface region of the component within the deposited region, and wherein the cooling rate regulates the resultant microstructure within the deposited region.

11. The method of claim 1, wherein the material comprises a nickel-based superalloy.

12. The method of claim 1, wherein the material comprises a nickel-based superalloy and a ceramic powder.

13. The system of claim 7, wherein the material comprises a nickel-based superalloy.

14. The system of claim 7, wherein the material comprises a nickel-based superalloy and a ceramic powder.

15. The non-transitory computer readable storage medium of claim 10, wherein the instructions, when executed, are further configured to cause the at least one processor to control the material delivery device to control at least one of an average beam power, a peak beam power density, a beam heat input, a ratio of a molten pool depth to the set target height, or a material flux of the material.

16. The non-transitory computer readable storage medium of claim 10, wherein the material comprises a nickel-based superalloy.

17. The non-transitory computer readable storage medium of claim 10, wherein the material comprises a nickel-based superalloy and a ceramic powder.

\* \* \* \* \*